(12) United States Patent
Wilken et al.

(10) Patent No.: US 9,807,926 B2
(45) Date of Patent: *Nov. 7, 2017

(54) AGRICULTURAL HARVESTING MACHINE

(71) Applicant: CLAAS Selbstfahrende Erntemaschinen GmbH, Harsewinkel (DE)

(72) Inventors: Andreas Wilken, Bissendorf (DE); Christoph Heitmann, Warendorf (DE); Bastian Bormann, Guetersloh (DE); Joachim Baumgarten, Beelen (DE); Sebastian Neu, Bad Laer (DE); Boris Kettelhoit, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,788

(22) Filed: Jul. 27, 2016

(65) Prior Publication Data

US 2017/0049045 A1 Feb. 23, 2017

(30) Foreign Application Priority Data

Aug. 17, 2015 (DE) .................. 10 2015 113 527

(51) Int. Cl.
*A01D 34/00* (2006.01)
*A01D 41/127* (2006.01)
(Continued)

(52) U.S. Cl.
CPC .......... *A01D 34/008* (2013.01); *A01D 41/06* (2013.01); *A01D 41/127* (2013.01);
(Continued)

(58) Field of Classification Search
CPC .... A01D 34/008; A01D 41/06; A01D 43/085; A01D 82/02; A01D 2101/00; A01D 41/127; A01D 41/141
See application file for complete search history.

(56) References Cited

U.S. PATENT DOCUMENTS 8,935,060 B2 1/2015 Baumgarten et al.
9,403,536 B2 8/2016 Bollin et al.
(Continued)

FOREIGN PATENT DOCUMENTS

DE 7826143 12/1978
DE 102008032191 1/2010
(Continued)

*Primary Examiner* — Yuen H Wong
(74) *Attorney, Agent, or Firm* — Collard & Roe, P.C.

(57) ABSTRACT

An agricultural harvesting machine has a header designed as a front attachment for cutting and picking up crop and a driver assistance system for controlling the header. The driver assistance system has a memory for storing data and a computing unit for processing the data stored in the memory. The header together with the driver assistance system forms an automated header, in that a plurality of selectable harvesting-process strategies is stored in the memory and in order to implement a selected harvesting-process strategy or the selected harvesting-process strategies, the computing device autonomously determines at least one machine parameter, a header parameter and specifies this to the header.

27 Claims, 4 Drawing Sheets

(51) Int. Cl.
*A01D 41/14* (2006.01)
*A01D 41/06* (2006.01)
*A01D 43/08* (2006.01)
*A01D 82/02* (2006.01)
*A01D 101/00* (2006.01)

(52) U.S. Cl.
CPC ......... *A01D 41/141* (2013.01); *A01D 43/085* (2013.01); *A01D 82/02* (2013.01); *A01D 2101/00* (2013.01)

(56) References Cited

U.S. PATENT DOCUMENTS

2010/0217474 A1\* 8/2010 Baumgarten ........ A01D 41/127
 701/31.4
2016/0309656 A1 10/2016 Wilken et al.

FOREIGN PATENT DOCUMENTS

| EP | 2 687 923 | 1/2014 |
| EP | 2 837 279 | 2/2015 |
| EP | 3 085 221 | 10/2016 |
| WO | WO 2014/093814 | 6/2014 |

\* cited by examiner

AGRICULTURAL HARVESTING MACHINE

CROSS-REFERENCE TO A RELATED APPLICATION

The invention described and claimed hereinbelow is also described in German Patent Application DE 10 2015 113527.2, filed on Aug. 17, 2015. The German Patent Application, the subject matter of which is incorporated herein by reference, provides the basis for a claim of priority of invention under 35 U.S.C. 119(a)-(d).

BACKGROUND OF THE INVENTION

The invention relates to an agricultural harvesting machine with a header designed as a front harvesting attachment for cutting and picking up crop and a driver assistance system for controlling the header.

The agricultural harvesting machines can be combine harvesters, forage harvesters, balers or the like and are regularly adaptable to harvesting different types of crop by equipping the machine with correspondingly different front harvesting attachments. In the case of a combine harvester, the front harvesting attachment (i.e., the header), comprises at least one reel, a cutterbar table, a knife bar disposed on the cutterbar table and an intake auger, which feeds cut crop to a feeder of the harvesting machine. Assigned to at least a portion of these components are drives, with which corresponding header parameters can be set, such as, for example, "knife bar height," "cutting angle," "cutterbar table length," "reel position," "intake auger speed," "reel speed" or "cutting frequency."

During harvesting operation, the reel guides the crop over the knife bar, on which the crop is cut. The cut crop lands on the cutterbar table, from where it is transported by an intake auger to the feeder. The cut crop is transferred to the feeder in a central region of the intake auger. For this purpose, intake auger fingers are provided in the central region of the intake auger, which fingers extend out of the intake auger in a controlled manner in order to pick up the cut crop and subsequently feed it to the feeder. Such an arrangement is described in DE 78 26 143 U1, for example. In this case, the extension angle at which the intake auger fingers extend out of the intake auger can be adjusted relative to the roller rotation. The further, adjustable header parameter "extension angle of the intake auger fingers" therefore results.

The optimal setting of the header parameters is highly significant not only for cutting and picking up, but also for all the downstream processes. In the case of a combine harvester, these downstream processes are, inter alia, threshing, separating, and cleaning.

An entire series of criteria exists on the basis of which the quality of the function of the header can be evaluated. The first objective is to minimize the losses at the header itself. Such losses resulting directly at the header are, for example, "pick-up losses," "cut crop losses," "bouncing grain losses" or the like. In addition, each of the set header parameters influences the aforementioned downstream processes, i.e., threshing, separating, and cleaning, in particular, in the case of the combine harvester. Due simply to the number of header parameters, it becomes clear that setting the header parameters in an optimal manner is a highly complex task.

In a known agricultural harvesting machine (DE 10 2008 032 191 A1), a driver assistance system is provided for controlling, inter alia, the header. The driver assistance system ensures that the crop stream is steady by determining different header parameters on the basis of the data from a crop stream sensor. This optimization is therefore directed only to the relationships prevailing at the header itself. A similarly fixedly configured optimization is disclosed in WO 2014/093814 A1, which relates to a forage harvester.

SUMMARY OF THE INVENTION

The present invention overcomes the shortcomings of known arts, such as those mentioned above.

To that end, the present invention provides a harvesting machine with a driver assistance system configured to operate such that a comprehensive and advantageous regulation of the header is possible with particularly less effort required by the driver.

In an embodiment, the invention provides a harvesting machine wherein the header, together with the driver assistance system, forms an automated header. This means that the driver assistance system, with a memory for storing data and with a computing unit, is designed to autonomously determine individual machine parameters of the header and to assign the individual machine parameters to the header. Such machine parameters are referred to herein as "header parameters." A basis for the determination of the header parameters is a selection, made by the user, of harvesting process strategies that are stored in the memory of the driver assistance system.

The invention also provides a manner of controlling the header specified by the driver making a one-time selection of the active harvesting-process strategy. Another entry by the driver is not required in order for the header parameters to be determined, in the narrower sense. The driver has the possibility, however, of changing the selected harvesting-process strategy if so desired so that autonomous control subsequently continues, although possibly with a different prioritization. The realization of an automated header according to the invention, which can function on the basis of entirely different harvesting-process strategies, results in possibilities for the user to exert influence in previously unknown ways, without increasing the complexity of use.

In an embodiment, a functional system model for at least one part of the harvesting machine is stored in the memory of the driver assistance system, which system model forms the basis for the autonomous determination of the at least one header parameter. The term "functional system model" means that at least a portion of the functional relationships within the harvesting machine are depicted by the system model. Examples of this are provided further below.

In another embodiment, the computing unit aligns the functional system model with the current harvesting-process state during the on-going harvesting operation. The consideration here is that of aligning the functional system model forming the basis for the autonomous determination of the header parameters with the actual conditions.

Preferably, the header parameters are determined cyclically during the harvesting operation. The term "cyclical" is intended to be interpreted broadly here and, in the present case, refers to a continuous determination having a cycle time that is constant but also varies. Such a cyclic determination of the at least one header parameter results in a good reaction time of the harvesting machine to changes in the harvesting-process state. Therefore, it is advantageous in this context also to align the functional system model with the current harvesting-process state in a cyclic manner. The cycle times must be set so as to be short enough that an aforementioned, advantageous reaction time can be achieved.

Preferably, the computing unit aligns the functional system model with the particular current harvesting-process state using a recursive method, so that the functional system model incrementally approaches the actual conditions. The harvesting process state refers to all state variables that are related to the harvesting process in any manner. These include field information and/or harvesting-process parameters and/or header parameters and/or environmental information.

In another embodiment, a sensor system for detecting at least a portion of the harvesting-process state is provided that makes it possible to implement the aforementioned cyclic alignment of the functional system model in a particularly simple manner.

In another embodiment, at least a portion of the harvesting-process state can be entered via an input/output device. This makes it possible to verify sensor information or determine state variables that are difficult to ascertain using sensors.

In another embodiment, at least one initial model is stored in the memory of the driver assistance system, which model can function as a starting value, in particular, for the aforementioned, continuous alignment of the functional system model. Given a suitable selection of the initial model, the functional system model can be brought into good conformance with the actual conditions in only a few alignment cycles.

In order to depict the functional relationships by the functional system model, it is provided that at least one family of characteristics is assigned to at least one harvesting-process parameter, wherein the harvesting-process parameter is the output variable of the particular family of characteristics. By use of an aforementioned family of characteristics, it also is possible to depict complex functional relationships with little computing effort. In particular, the aforementioned recursive alignment of the functional system model can be carried out with relatively little computing effort.

An aforementioned family of characteristics, in this case and preferably very generally, is the dependence of an output variable on at least one input variable, in particular on two or multiple input variables.

In the sense of the aforementioned alignment of the functional system model with the actual harvesting-process state, it is provided that the computing unit aligns the at least one family of characteristics with the actual harvesting-process state during the on-going harvesting operation, preferably cyclically. For the implementation of such an alignment, it is preferably provided that multiple points within the family of characteristics are measured again by a sensor system. A deviation of the measured points from the associated points of the functional system model results in a corresponding alignment of the at least one family of characteristics.

For the implementation of the particular selected harvesting-process strategy on the basis of the functional system model, it is provided to store at least one implementation instruction in the memory. One example of such an implementation instruction is the determination of the at least one header parameter in a pure control process. In the simplest case, the computing unit functions to determine the at least one header parameter as a characteristic control on the basis of the aforementioned at least one family of characteristics. In the course of the determination of the at least one header parameter, it is possible to omit complex regulating processes with associated regulation-related feedback.

A further implementation instruction that is preferably used consists of utilizing a multi-objective optimization for the simultaneous implementation of mutually conflicting harvesting-process strategies. And a further implementation instruction consists of defining premises, on the basis of which the computing unit carries out a prioritization between different aspects. Within the scope of the multi-objective optimization, in particular, the definition of premises makes it possible to effectively determine header parameters.

Further implementation instructions relating to the setting or optimization of individual, preferred harvesting-process parameters also are possible.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

Figure 1:
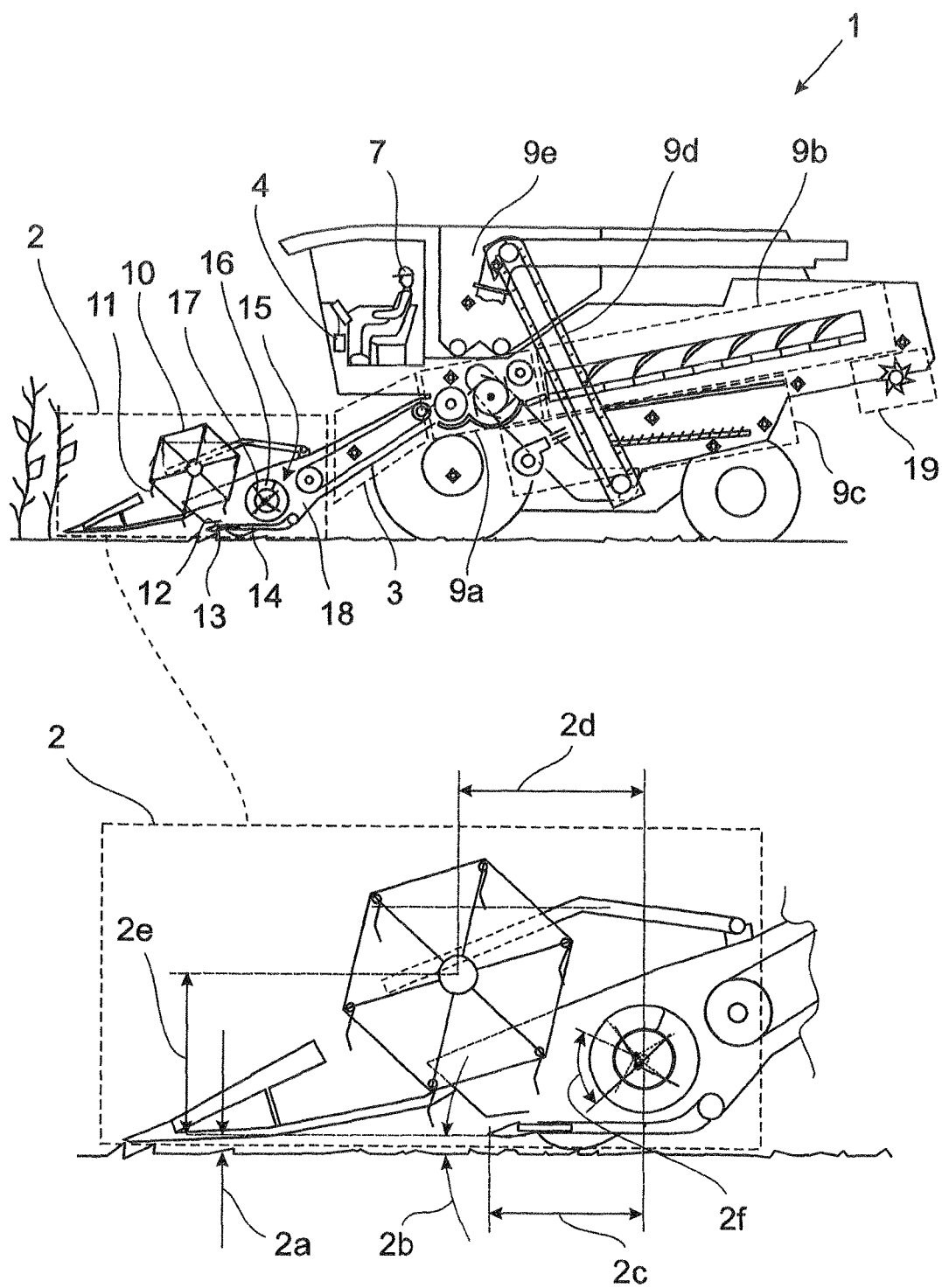
FIG. 1 presents a side view of a harvesting machine according to the invention.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

As shown in the drawing figures, an agricultural harvesting machine 1 according to the invention comprises a header 2, which is designed as a front harvesting attachment, for cutting and picking up crop. The header 2 is preferably replaceable by another header 2, so that the harvesting machine 1 can be adapted to harvesting different types of crop. In this case, the crop is understood to mean all the material picked up from the field crop via the header 2. As is apparent in FIG. 1, a field crop is mowed by the header 2 and the crop obtained thereby is fed to a feeder 3.

Figure 2:
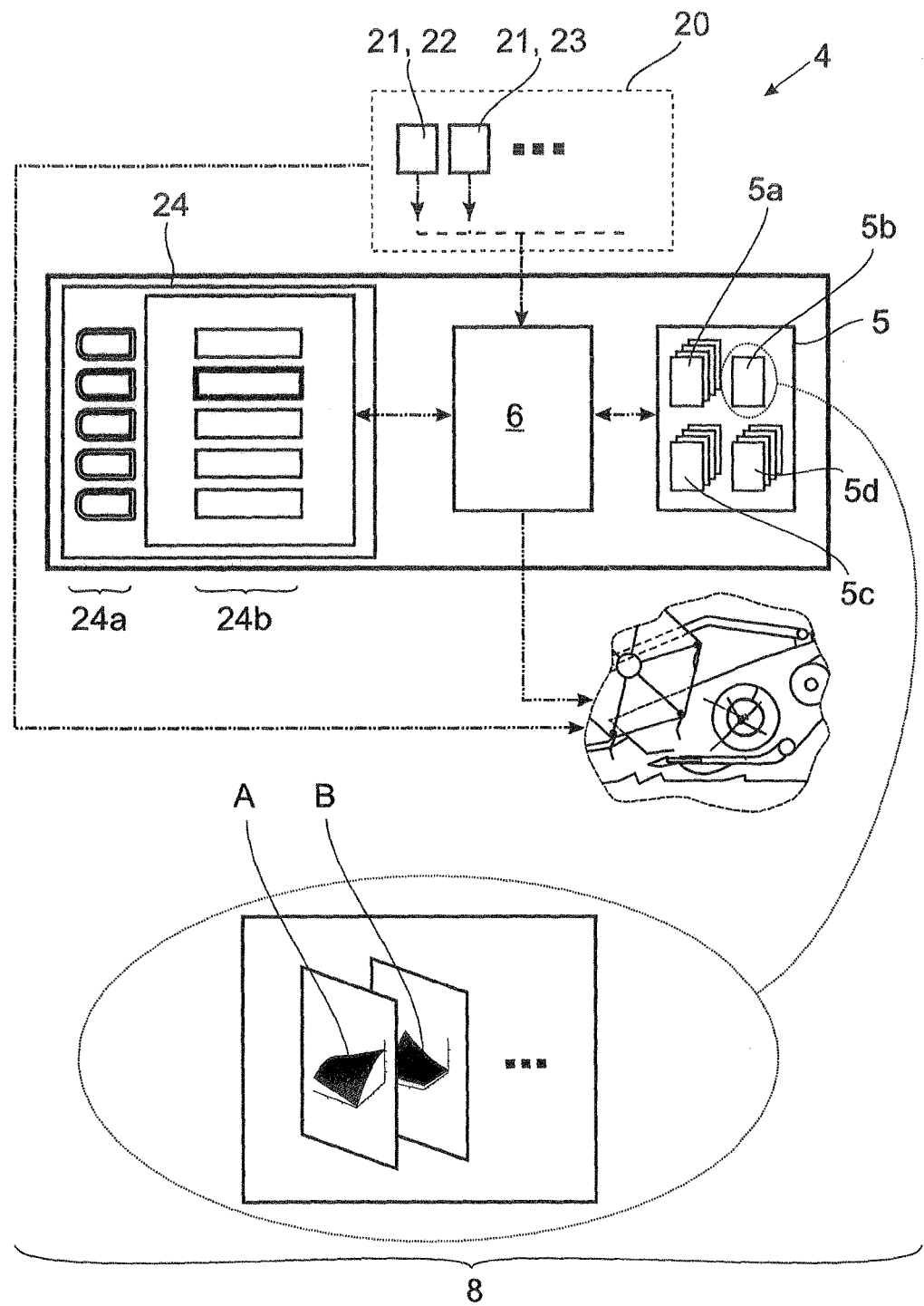
FIG. 2 presents a schematic depiction of a driver assistance system of a harvesting machine according to the invention.

The harvesting machine 1 further comprises a driver assistance system 4 for controlling the header 2. This driver assistance system 4 comprises a memory 5 for storing data, i.e., a memory in the sense of information technology, and a computing unit 6 for processing the data stored in the memory 5. The driver assistance system 4 is designed to support a driver 7 of the harvesting machine 1 during the operation of the harvesting machine. The driver assistance system 4 comprising the memory 5 and the computing unit 6 is schematically shown in FIG. 2.

The header 2, together with the driver assistance system 4, forms an automated header 8. This is realized according to the invention in that a plurality of selectable harvesting-process strategies 5a is stored in the memory 5 and, in order to implement a selected harvesting-process strategy 5a or the harvesting-process strategies 5a, the computing unit 6 autonomously determines at least one machine parameter for the header 2 and specifies the machine parameter to the header 2. Such machine parameters for the header 2 are referred to here as "header parameters." In this manner, an aforementioned automated header 8 is provided, which comprehensively regulates all variables that are relevant for the work of the header 2, such that the variables are coordinated with one another. The situation is therefore avoided, in particular, in which there are conflicting controls which come from different directions and could possibly cancel each other out. Instead, the control of all relevant parameters is carried out "under one roof". In addition, the driver 7 can specify a desired qualitative result and does not need to have his own expert knowledge of the details required for this result.

The determination of the header parameters is an autonomous determination to the extent that, in principle, the harvesting-process strategy 5a is implemented by the computing unit 6 without the need for intervention by the driver 7 or for a query to the driver during the determination of the header parameters in the narrower sense. Such an intervention by the driver 7 is therefore still possible, in principle, but is not necessary. In this case, the stored harvesting-process strategies 5a differ in terms of the objective of setting or optimizing harvesting-process parameters, which will be explained further below.

It should be noted that the driver assistance system 4 can be centrally designed. The driver assistance system is used to control not only the header 2, but also downstream working units. It also is conceivable, however, that the driver assistance system 4 is decentrally structured and is composed of a number of individual control systems. It can then be provided, for example, that at least a portion of the working units of the harvesting machine 1 each have an assigned, decentralized control system.

It has already been pointed out that the harvesting machine 1 can be any type of harvesting machine 1, to which a header 2 designed as a front harvesting attachment is assigned. In the exemplary embodiment, which is shown and insofar preferred, the harvesting machine 1 is designed as a combine harvester. Correspondingly, a threshing unit 9a is disposed downstream from the header 2 for threshing pick-up crop to obtain grain. The threshing unit 9a is equipped with a threshing drum in the usual manner, which threshing drum interacts with a threshing concave. A separation system 9b is disposed downstream from the threshing unit 9a in terms of processing. The crop stream fed to the threshing unit 9a is therefore subsequently fed, without the grain already obtained here, to the separation system 9b.

In the separation system 9b, the crop is then moved, e.g., shaken, along with the grain portion remaining therein, in such a way that the remaining grain is also preferably separated from the straw and the rest of the crop. The grain obtained in the threshing unit 9a and in the separation system 9b is then fed to a cleaning system 9c. In the cleaning system 9c, which usually has multiple stages, material other than grain, e.g., chaff and straw parts, which has been carried along in the grain up to this point, as well as non-threshed material, such as, e.g., ear tips or awns, are separated from the grain. The cleaned grain then passes via a transport system 9d, e.g., a grain elevator, into a grain tank 9e. The threshed straw, i.e., the crop remaining in the separation system 9b, is deposited by the combine harvester, e.g., as swath, along the wheel track.

As an alternative, the harvesting machine 1 can be designed as a forage harvester. In this case, a compression-roller system and a chopper unit disposed downstream from the compression-roller system are disposed downstream from the header 2. Separation is not necessary in the case of a forage harvester, since the picked-up crop is merely cut by the chopper unit. The following statements are directed primarily to the depicted harvesting machine 1, which is designed as a combine harvester. All the statements made in this regard and which relate to the header 2 apply similarly, however, to a harvesting machine 1 designed as a forage harvester.

The header 2 of the depicted harvesting machine 1 comprises a reel 10, which extends transversely to the direction of travel of the harvesting machine 1, and which already acts on the still uncut crop via tines 11 disposed thereon. The primary task of the reel 10 is to feed the crop to a knife bar 12, which has a movable knife 13. The knife 13 oscillates at a cutting frequency, and so the crop is cut and drops onto a cutterbar table 14, on the front side of which the knife bar 12 is located. Subsequently, the crop, possibly with further engagement by the reel 10, is fed to the feeder 3 by means of an intake auger 15. For this purpose, the intake auger 15 is equipped with sheet metal panels 16 disposed on either side of a central region of the intake auger 15, which is also referred to as the "intake region."

As a result, the cut crop is initially transported to the intake region of the intake auger 15 and, from there, to the feeder 3. In the intake region, multiple intake auger fingers 17 are assigned to the intake auger 15, which fingers each extend out of the intake auger 15 at an extension angle of the intake auger 15 and retract into the intake auger 15 at a retraction angle of the intake auger, relative to the roller rotation and cyclically in each case. The intake auger fingers 17 must be retracted in order to prevent drawn-in crop from circulating entirely around the intake auger 15 without being transferred to the feeder 3.

All the aforementioned components of the header 2 are disposed on a support frame 18, which is formed from multiple frame parts.

Depending on the equipment, the header 2 permits different header parameters to be set by means of corresponding drives, which are not depicted here and which can be controlled via the driver assistance system 4.

Assigned to the knife bar 12, for example, are the header parameter 2a "knife bar height" and the header parameter 2b "cutting angle," as shown in FIG. 1. The header parameter 2c "cutterbar table length" is assigned to the variable-length cutterbar table 14. Assigned to the reel 10 are the header parameter 2d "reel position (horizontal)" and the header parameter 2'e "reel position (vertical)." In addition, the header parameters "intake auger speed," "reel speed," and "cutting frequency" are further header parameters, which can be preferably set by the driver assistance system 4. Finally, the controllability of the aforementioned intake auger fingers 17 results in the header parameter 2f "extension angle of the intake auger fingers," which defines the angular position, relative to the rotation of the intake auger 15, at which the intake auger fingers 17 extend out of the intake auger 15.

The aforementioned header parameters influence not only the function of the header 2 in the narrower sense, but also the function of the downstream working units, i.e., in this case, the function of the threshing unit 9a, the separation system 9b, and the cleaning system 9c. A spreader system 19 for spreading the material other than grain on the field may also need to be taken into consideration, which system can also be influenced by the header parameters of the header 2. Exemplary relationships are explained further below.

In this case and preferably, a functional system model 5b for at least one part of the harvesting machine 1 is stored in the memory 5 of the driver assistance system 4, wherein the computing unit 6 carries out the aforementioned, autonomous determination of the at least one header parameter 2a-f on the basis of the system model 5b.

The functional system model 5b is a computational model for depicting functional relationships within the harvesting machine 1. Examples of such functional relationships are explained further below.

The functional system model 5b is aligned with the current harvesting-process state by the computing unit 6, preferably during the on-going harvesting operation. This means that the computing unit 6 checks to determine whether the functional relationships depicted in the functional system model 5b match the actual harvesting-process state. If this check reveals deviations, the computing unit 6 implements an appropriate change in the functional system model 5b. In a particularly preferred embodiment, this alignment takes place cyclically, wherein reference is made to the general part of the description with respect to the broad interpretation of the term "cyclically".

In an embodiment, the computing unit 6 aligns the functional system model 5b, in a recursive method, with the actual harvesting-process state and stores the system model 5b in the memory 5. This is accomplished in that the functional system model 5b stored in the memory 5 before the alignment is taken into account in the alignment. Therefore, an incremental alignment of the system model 5b is provided.

In the sense of short reaction times of the harvesting machine 1 to changing harvesting-process states, it is preferably provided that the computing unit 6 determines the header parameters cyclically, in the sense described above. Reference is made to the broad interpretation of the term "cyclically" in this context as well.

As explained further above, the term "harvesting-process state" includes all information related to the harvesting process. This includes field information such as "crop density," "crop height," "crop moisture," "stalk length" and "laid portion." This further includes the harvesting-process parameter "cut crop losses" as a measure of the crop that has been cut but not picked up, the harvesting-process parameter "bouncing grain losses" as a measure of the grains lost due to the interaction between the reel 10 and the crop, the harvesting-process parameter "uniformity of transverse distribution of crop stream" as a measure of the uniform distribution of the crop across the width of the feeder 3, the harvesting-process parameter "temporal variation of crop stream" as a measure of the uniform distribution, with respect to time, of the crop along the conveyance direction of the feeder 3, the harvesting-process parameter "separation losses" as a measure of the grains dropped on the field by the separation system 9b, the harvesting-process parameter "cleaning losses" as a measure of the grains dropped on the field by the cleaning system 9c, and the harvesting-process parameter "fuel consumption" as a measure of the energy consumption of the header 2 overall. Finally, this also includes header parameters such as "knife height," "cutting angle," "cutterbar table length," "extension angle of the intake auger fingers," "reel position (horizontal)," "reel position (vertical)," "intake auger speed," "reel speed" and "cutting frequency," as well as environmental information such as "ambient temperature" and "ambient humidity." All this information to be incorporated into the computation of the harvesting-process state can be determined in different ways.

In principle, an aforementioned harvesting-process parameter also can be the harvesting-process parameter "material feed height" as a measured of the throughput. With regard to the term "material feed height", it should be noted that this term should be broadly interpreted and includes both the material feed height of the crop stream picked up via the feeder 3, in the narrower sense, as well as the throughput of the crop stream conveyed via the feeder 3. In particular, the term "material feed height" can be replaced by the term "throughput" in the present case.

In an embodiment, a sensor system 20 for detecting at least a portion of the harvesting-process state is provided. The sensor system 20 is preferably provided with multiple sensors 21. For example, the sensor system 20 comprises a crop stream sensor 22 for detecting the crop stream. The crop stream sensor 22 can be designed so as to be camera-based, for example, and can provide information regarding the harvesting-process parameters "uniformity of transverse distribution of crop stream" and/or "temporal variation of crop stream". Alternatively or additionally, the sensor system 20 can comprise a crop sensor 23 for gathering field crop information.

Alternatively to the detection of the harvesting-process state by a sensor system 20, it also can be provided that an input/output device 24 is assigned to the driver assistance system 4, wherein at least a portion of the harvesting-process state can be entered via the input/output device 24. In this case, the computing unit 6 preferably generates queries related to the current harvesting-process state and outputs said queries via the input/output device 24. In response to such a query, the driver 7 can input at least a portion of the harvesting-process state via the input/output device 24. The input/output device 24 comprises suitable input elements 24a and output elements 24b for this purpose.

An aforementioned query preferably consists of determining how high the estimated field crop information "laid portion" is, i.e., the portion of laid grain in the field crop. In the simplest case, the driver 7 is provided with a selection of predetermined answers.

As described above, the system model 5b is aligned, preferably cyclically, with the actual harvesting-process state. At least one initial model 5c is stored in the memory 5, as the starting value for the system model 5b, wherein, in the first determination of the at least one header parameter, the computing unit 6 carries out the determination on the basis of the initial model 5b. The wording "first determination" refers to the situation, in particular, at the beginning of the harvesting operation, in which an alignment of the system model 5b has not yet been carried out.

In an embodiment, at least two initial models 5c are stored in the memory 5, wherein the computing unit 6 selects an initial model 5c depending on the particular harvesting-process state, on which the initial model the subsequent determination of the header parameters is initially based.

The harvesting-process strategies 5a under discussion, which can be selected by the driver 7, are each directed toward different objectives. In a first variant, at least one harvesting-process strategy 5a is directed to the objective of setting or optimizing at least one harvesting-process parameter such as "cut crop losses," "bouncing grain losses," "uniformity of transverse distribution of crop stream," "temporal variation of crop stream," "separation losses," "cleaning losses," or "fuel consumption," or the like. The implementation of the harvesting-process strategy 5a is intended to be accomplished, in this case, by a corresponding specification of header parameters, i.e., in this case and preferably, header parameters such as "cutterbar table length" and "extension angle of the intake auger fingers."

The system model 5b preferably depicts at least a portion of the functional relationships between a harvesting-process parameter and at least one further parameter, i.e., in this case and preferably, at least one header parameter.

For the depiction of the functional relationships, at least one family of characteristics A, B is assigned to a harvesting-process parameter, wherein, in this case, this harvesting-process parameter is defined as an output variable of the at least one family of characteristics A, B. The input variable for the at least one family of characteristics A, B is preferably a header parameter, in particular the header parameters "cutterbar table length" and "extension angle of the intake auger fingers."

Figure 3:
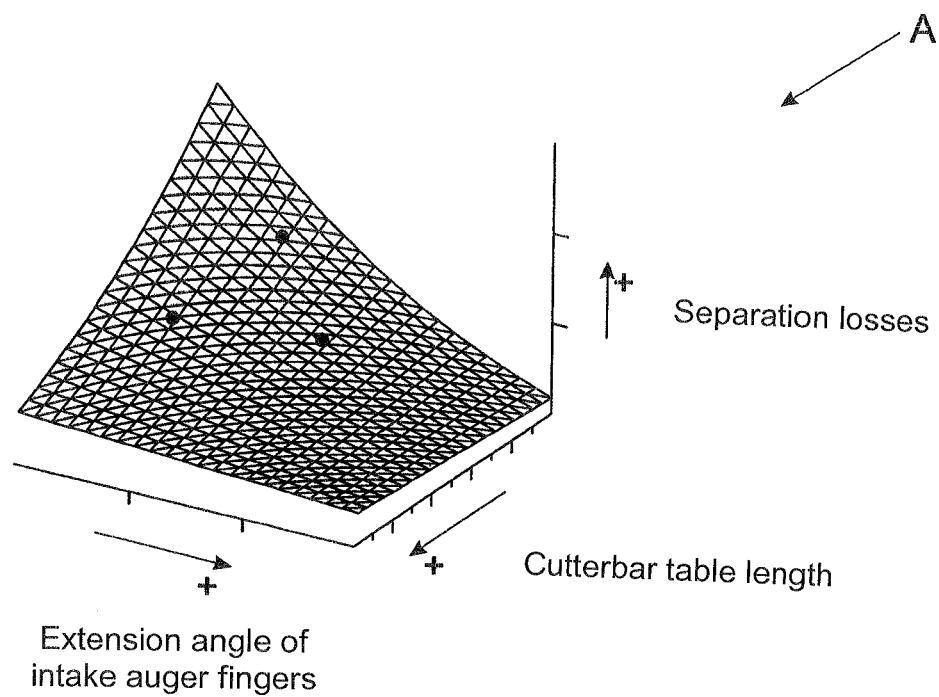
FIG. 3 presents a family of characteristics having the output variable "separation losses" and having the input variables "extension angle of the intake auger fingers" and "cutterbar table length"

FIG. 3 shows the family of characteristics A for the functional relationship between the output variable "separation losses" and the input variables "cutterbar table length" and "extension angle of the intake auger fingers." As indicated, the separation losses are that much lower, at least in the first approximation, the greater the cutterbar table length is. It also is clear from the family of characteristics A that the separation losses are that much lower, the greater the extension angle of the intake auger fingers 17 is, i.e., the later the intake auger fingers are extended. These relationships make it apparent that the separation losses are that much lower in practical application, the smaller the temporal variation of the crop stream is. This temporal variation can be reduced by increasing the cutterbar table length and by increasing the extension angle for the intake auger fingers 17.

Figure 4:
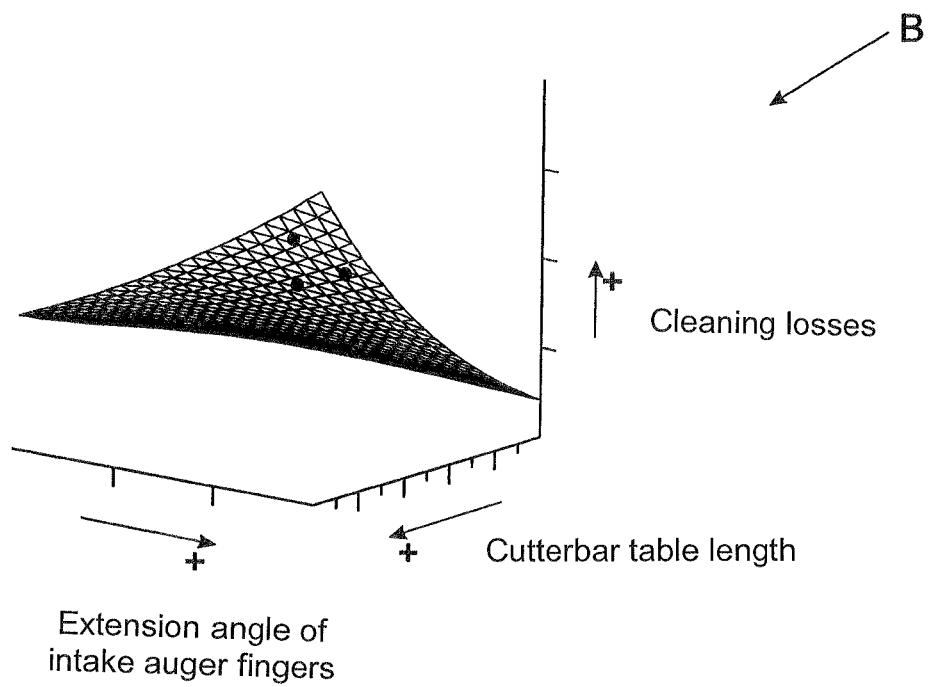
FIG. 4 presents a family of characteristics having the output variable "cleaning losses" and having the input variables "extension angle of the intake auger fingers" and "cutterbar table length."

FIG. 4 shows the family of characteristics B for the functional relationship between the output variable "cleaning losses" and the input variables "cutterbar table length" and "extension angle of the intake auger fingers." As indicated, the cleaning losses are that much lower, at least in the first approximation, the smaller the cutterbar table length is and the smaller the extension angle of the intake auger fingers 17 is. This is due to the fact that, in practical application, the cleaning losses are that much lower, the more uniformly the crop is distributed across the width of the feeder 3. Such a uniform distribution is achieved by a great cutterbar table length and a small extension angle of the intake auger fingers 17, i.e., an earlier extension of the intake auger fingers 17.

In principle, it can be provided that the computing unit 6 always uses one and the same family of characteristics A, B, possibly with a modification based on the aforementioned alignment, as the basis for the determination of the at least one harvesting-process parameter. Preferably, the computing unit 6 selects at least one family of characteristics A, B depending on the current harvesting-process state and uses this as the basis for the determination of the at least one header parameter. It is therefore possible to react to a change in harvesting-process states, for example, to a change in crop moisture, or the like, for example, by way of a suitable selection of the family of characteristics A, B.

The above-described alignment of the system model 6b with the current harvesting-process state is preferably carried out, in the case of the system model 5b having at least one family of characteristics A, B, in that the computing unit 6 aligns the at least one family of characteristics A, B with the harvesting-process state during the on-going harvesting operation, in particular cyclically. On the basis of the initial model 5c, at least one initial family of characteristics is stored in the memory 5 as a starting value, wherein, in the first determination of the at least one header parameter, the computing unit 6 therefore carries out the determination of the at least one header parameter on the basis of the initial family of characteristics 5c. A series of real sensor measured values is plotted for the particular harvesting-process state in each of the FIGS. 3 to 4.

In the aforementioned alignment, the computing unit 6 implements a change in the particular family of characteristics a, b in order to move the family of characteristics A, B closer to the real sensor measured values. For example, the entire family of characteristics A, B can be shifted in the direction of the particular output variable, which is upward or downward in FIGS. 3 to 4. It is particularly advantageous, however, when the shift of the family of characteristics A, B is achieved in such a way that it also induces a change in the curves of the particular characteristics.

At least one implementation instruction 5d is stored in the memory 5 for the implementation of the harvesting-process strategy 5a by the computing unit 6. Various advantageous variants are conceivable for the implementation instruction 5d. In a first variant, an implementation instruction 5d implements the determination of the at least one header parameter in a control process and not in a regulating process. In this case, the computing unit 6 functions to determine the at least one header parameter, preferably as a characteristic control. Regulation-related feedback is therefore not provided in the determination of the header parameters. The reaction of the computing unit 6 to changes in the harvesting-process state results solely from the aforementioned alignment of the system model 5b with the particular current harvesting-process state. This basic principle of the control of the header 2 results in a simplification of the determination of the header parameters by eliminating the regulation-related feedback. As a result, it is possible to also implement complex functional relationships, in particular the conflicting strategies to be explained in the following, with minor computing effort and relatively quickly.

Conflicting strategies can result, for example, when at least one selectable harvesting-process strategy 5a comprises at least two sub-strategies, which conflict with one another with respect to one and the same header parameter. A second possibility in this context is that at least two selectable harvesting-process strategies as such conflict with one another with respect to one and the same header parameter. For example, the reduction of the separation losses according to FIG. 3 requires that the cutterbar table length be increased, whereas a reduction in the cleaning losses according to FIG. 4 requires that the cutterbar table length be increased.

In the aforementioned situations, an implementation instruction 5d for implementing the mutually conflicting strategies preferably includes a multi-objective optimization, which can be a Pareto optimization, for example. Such a multi-objective optimization can be implemented particularly easily on the basis of the system model 5b, preferably on the basis of the aforementioned families of characteristics A, B and, further preferably, using the aforementioned characteristic control.

In particular, in the implementation of the mutually conflicting strategies, it is preferably provided that an implementation instruction 5d includes at least one premise, on the basis of which the computing unit 6, in the autonomous determination of the at least one header parameter, implements a prioritization between selected harvesting-process strategies 5a and/or between sub-strategies of a selected harvesting-process strategy 5a and/or between harvesting-process parameters to be set or optimized, and/or between header parameters to be specified.

According to the explanations of the families of characteristics A, B presented above, specifically speaking, for the harvesting-process strategy for setting or optimizing the harvesting-process parameter "separation losses", an implementation instruction 5d consists in the computing unit 6 specifying, in response to an increase in the harvesting-process parameter "separation losses" and on the basis of on the system model 5b, an increase in the header parameter "extension angle of the intake auger fingers" and/or an increase in the header parameter "cutterbar table length".

In addition, it is preferable that, for the harvesting-process strategy for setting or optimizing the harvesting-process parameter "cleaning losses", an implementation instruction 5d consists in the computing unit 6 specifying, in response to an increase in the harvesting-process parameter "cleaning losses" and on the basis of the system model 5b, a decrease in the header parameter "extension angle of the intake auger fingers" and/or a reduction in the header parameter "cutterbar table length".

Finally, it is preferable that, for the harvesting-process strategy for setting or optimizing the harvesting-process parameter "fuel consumption", an implementation instruction 5d consists in the computing unit 6 specifying, in response to an increase in the harvesting-process parameter "temporal variation of crop stream" and on the basis of the system model 5b, an increase in the header parameter "extension angle of the intake auger fingers" and/or an increase in the header parameter "cutterbar table length".

It should be noted that further implementation instructions 5b are conceivable, which, in turn, can be based on further variants of the system model 5b, in particular on further families of characteristics.

LIST OF REFERENCE NUMBERS 1 harvesting machine
2 header
2a knife bar height
2b cutting angle
2c cutterbar table length
2d reel position (horizontal)
2e reel position (vertical)
2f extension angle
3 feeder
4 driver assistance system
5 memory
5a harvesting-process strategy
5b functional system model
5c initial model
5d implementation instruction
6 computing unit
7 driver
8 automated header
9 transport system
9a threshing unit
9b separation system
9c cleaning system
9d elevator
9e grain tank
10 reel
11 tine
12 knife bar
13 knife
14 cutterbar table
15 intake auger
16 sheet metal panel
17 intake auger fingers
18 support frame
19 spreader system
20 sensor system
21 sensors
22 crop stream sensor
23 crop sensor
24 I/O device
24a input element
24b output element
A, B family of characteristics As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural harvesting machine, comprising:
a header designed as a front harvesting attachment, for cutting and picking up crop; and
a driver assistance system for controlling the header, wherein the driver assistance system comprises a memory for storing data and a computing device for processing the data stored in the memory;
wherein a plurality of selectable harvesting process strategies is stored in the memory;
wherein the header comprises components selected from the group consisting of a reel, a knife bar, a cutterbar table and an intake auger,
wherein the driver assistance system sets header parameters which are selected from any of the group consisting of a knife bar height, a cutting angle, a cutterbar table length, a reel position (horizontal), a reel position (vertical), an intake auger speed, a reel speed, a cutting frequency, and environmental information,
wherein the driver assistance system controls multiple intake auger fingers which are assigned to the intake auger by setting at least an extension angle of the intake auger to extend each of the multiple intake auger fingers out of the intake auger and at least a retraction angle to retract each of the multiple intake auger fingers into the intake auger, relative to a roller rotation and cyclically in each case,
wherein the computing device autonomously determines at least one machine parameter and specifies the at least one machine parameter to the header in order to implement at least one selected harvesting process strategy.

2. The harvesting machine according to claim 1, wherein the harvesting machine is a combine harvester and comprises a threshing unit disposed downstream from the header, a separation system disposed downstream from the threshing unit and a cleaning system disposed downstream from the separation system.

3. The harvesting machine according to claim 1, wherein the harvesting machine is a forage harvester and comprises a compression-roller arrangement disposed downstream from the header and a chopper unit disposed downstream from the compression-roller system.

4. The harvesting machine according to claim 1, wherein a functional system model for at least one part of the harvesting machine is stored in the memory and the computing device autonomously determines the header parameter based on the functional system model.

5. The harvesting machine according to claim 4, wherein the functional system model depicts at least a portion of functional relationships between a harvesting process parameter selected from the group consisting of cut crop losses, bouncing grain losses, uniformity of transverse distribution of crop stream, temporal variation of crop stream, separation losses, cleaning losses, fuel consumption and at least one header parameter.

6. The harvesting machine according to claim 5, wherein for a depiction of the functional relationships, at least one family of characteristics (A, B) is assigned to a harvesting process parameter, and wherein the harvesting process parameter is the output variable of the at least one family of characteristics (A, B).

7. The harvesting machine according to claim 6, wherein the header parameter is an input variable for the at least one family of characteristics (A, B).

8. The harvesting machine according to claim 6, wherein the computing device selects the at least one family of characteristics (A, B) depending on a harvesting process state and uses the at least one family of characteristics (A, B) as a basis for a determination of at least one header parameter.

9. The harvesting machine according to claim 5, wherein the computing device aligns the at least one family of characteristics (A, B) with a harvesting process state during an on-going harvesting operation, cyclically, wherein at least one initial family of characteristics is stored in the memory and wherein in a first determination of the at least one header parameter, the computing device carries out a determination on a basis of the at least one initial family of characteristics.

10. The harvesting machine according to claim 5, wherein at least one implementation instruction is stored in the memory, according to which the computing device and on a basis of the functional system model, carries out the implementation of the selected at least one harvesting process strategy by determining the at least one header parameter.

11. The harvesting machine according to claim 10, wherein the at least one implementation instruction determines the at least one header parameter in a control process as a characteristic control.

12. The harvesting machine according to claim 10, wherein the selected at least one harvesting process strategy comprises at least two sub-strategies, each of which is directed to setting or optimization of a harvesting process parameter.

13. The harvesting machine according to claim 12, wherein at least two harvesting-process strategies are selected from the at least one harvesting process or at least two sub-strategies of a selectable harvesting process strategy conflict with one another with respect to one and the same header parameter.

14. The harvesting machine according to claim 13, wherein the at least one implementation instruction includes a multi-objective optimization for a simultaneous implementation of mutually conflicting strategies.

15. The harvesting machine according to claim 14, wherein the at least one implementation instruction includes at least one premise, on a basis of which the computing device, in the autonomous determination of the at least one header parameter, implements a prioritization between at least one of selected harvesting process strategies, sub-strategies of a selected harvesting process strategy, harvesting process parameters to be set or optimized and header parameters to be specified.

16. The harvesting machine according to claim 5, wherein for the harvesting process strategy for setting or optimizing the separation losses, an implementation instruction consists in the computing device specifying, in response to an increase in the harvesting process parameter separation losses and on a basis of the functional system model, an increase in the extension angle of the intake auger fingers, an increase in the cutterbar table length or both.

17. The harvesting machine according to claim 5, wherein for the harvesting process strategy for setting or optimizing the cleaning losses, an implementation instruction consists in the computing device specifying, in response to an increase in the cleaning losses and on a basis of the functional system model, a decrease in the extension angle of the intake auger fingers, a decrease in the cutterbar table length, or both.

18. The harvesting machine according to claim 5, wherein for the harvesting process strategy for setting or optimizing the fuel consumption, an implementation instruction consists in the computing device specifying, in response to an increase in the temporal variation of crop stream and on a basis of the functional system model, an increase in the extension angle of the intake auger fingers, an increase in the cutterbar table length or both.

19. The harvesting machine according to claim 1, wherein the computing device cyclically aligns a functional system model with a current harvesting process state during on-going harvesting operation.

20. The harvesting machine according to claim 19, wherein the current harvesting process state comprises field crop information selected from the group consisting of crop density, crop height, crop moisture, stalk length, laid portion and harvesting-process parameters.

21. The harvesting machine according to claim 20, wherein harvesting process parameters are selected from the group consisting of cut crop losses, bouncing grain losses, uniformity of transverse distribution of crop stream, temporal variation of crop stream, separation losses, cleaning losses, fuel consumption and header parameters.

22. The harvesting machine according to claim 21, wherein the environmental information includes any one of ambient temperature and ambient humidity.

23. The harvesting machine according to claim 19, wherein at least one initial functional system model is stored in the memory and, in a first determination of at least one header parameter, the computing device determines the at least one header parameter based on the initial functional system model at a beginning of the on-going harvesting operation.

24. The harvesting machine according to claim 19, wherein at least two initial functional system models are stored in the memory and the computing device selects one of the two initial functional system models depending on the current harvesting process state, upon which a subsequent determination of the at least one header parameter is based.

25. The harvesting machine according to claim 1, further comprising a sensor system for ascertaining at least a portion of a harvesting-process state.

26. The harvesting machine according to claim 1, further comprising an input/output device wherein at least a portion of a harvesting process state is entered via the input/output device.

27. The harvesting machine according to claim 1, wherein the selected at least one harvesting process strategies are each directed to setting or optimizing at least one harvesting-process parameter selected from the group consisting of cut crop losses, bouncing grain losses, uniformity of transverse distribution of crop stream, temporal variation of crop stream, separation losses, cleaning losses and fuel consumption by a corresponding header parameter.

* * * * *